United States Patent [19]

Suzuki et al.

[11] 4,085,907
[45] Apr. 25, 1978

[54] MAGNETIC TAPE MAGAZINE

[75] Inventors: Osamu Suzuki; Kengo Oishi; Goro Akashi; Kenji Sega, all of Odawara, Japan

[73] Assignee: Fuji Photo Film Co., Ltd., Japan

[21] Appl. No.: 777,536

[22] Filed: Mar. 14, 1977

Related U.S. Application Data

[63] Continuation of Ser. No. 685,900, May 12, 1976, abandoned.

[30] Foreign Application Priority Data

May 12, 1975 Japan .................................. 50-56553

[51] Int. Cl.$^2$ .............................................. G11B 23/10
[52] U.S. Cl. .................................................. 242/199
[58] Field of Search ............... 242/199, 200, 198, 197, 242/71.2, 71.1, 210; 360/96, 94, 132

[56] References Cited

U.S. PATENT DOCUMENTS

| | | | |
|---|---|---|---|
| 3,556,433 | 1/1971 | Abitboul | 242/199 |
| 3,675,875 | 7/1972 | Schmidt | 242/199 |
| 3,712,559 | 1/1973 | Schwartz | 242/199 |
| 3,891,159 | 6/1975 | Nelson | 242/199 |

FOREIGN PATENT DOCUMENTS 2,062,458  7/1972  Germany .............................. 242/199

Primary Examiner—George F. Mautz

[57] ABSTRACT

Elastic cushion sheets are interposed between friction sheets and the inner walls of the casing of a tape magazine to press the side faces of the tape convolutions. By the pressure of the elastic cushion sheets exerted on the side faces of the tape convolutions, the edges of the tape are effectively aligned in the convolutions.

4 Claims, 7 Drawing Figures

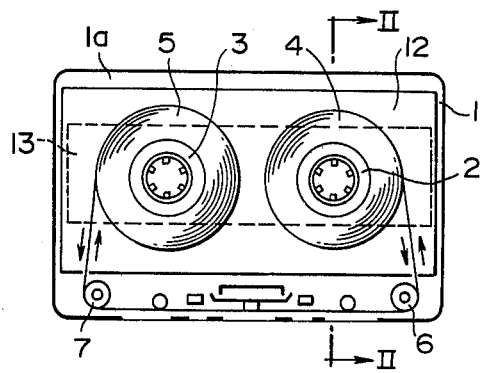
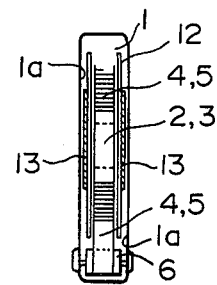
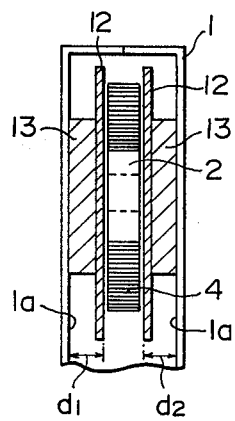
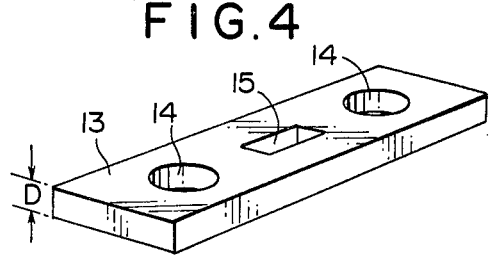
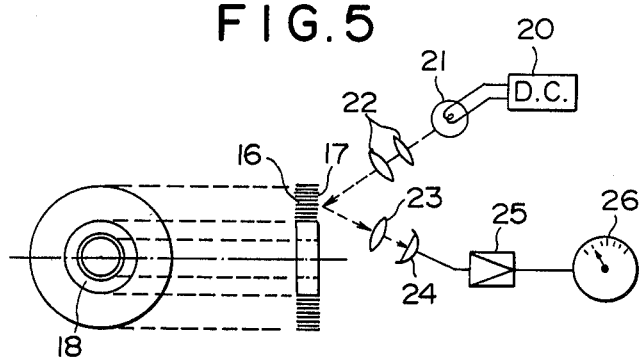

MAGNETIC TAPE MAGAZINE

This is a continuation, of application Ser. No. 685,900 filed May 12, 1976, now abandoned.

BACKGROUND OF THE INVENTION

1. Field of the Invention

This invention relates to a magnetic tape magazine, and more particularly to a magnetic tape magazine which contains a magnetic recording tape wound on a tape feed-out core and a tape take-up core or on a single feed-out and take-up core provided therein.

2. Description of the Prior Art

In order to minimize the size of magnetic tape recorders, it is necessary to make the size of the magnetic tape magazine used therein as small as possible. In order to reduce the size of the magnetic tape magazine, it is necessary to manufacture thin long-play magnetic tapes. The long-play magnetic tapes should best be mirror finished to carry thereon a magnetic recording material with high density. The mirror finished thin magnetic tape is apt to jam and is hard to wind up on a core so that the side faces of the coiled tape are perfectly flat. For instance, the side faces of the tape convolution are apt to be curved or rough. This is because the friction coefficient between the recording face of the tape and a backing member located in contact therewith is as large as 0.4 or more and because an air flow sometimes forms a space or air gap between the tape and the backing member. Trouble in the tape feed occurs frequently when the speed of the tape feed increases.

In the conventional magnetic tape magazine, a pair of friction sheets are inserted between the tape convolution and the upper and lower walls of the magazine to make the side faces of the tape convolution flat and smooth. However, it is very difficult to wind the tape on the core with consistent smoothness. Particularly, when the tape is quickly advanced in the magazine or rewound at a high speed, the side faces of the tape convolution become rough and the side edges of the tape rub the inner face of the walls or the friction sheets so that back tension on the tape increases when the tape is advanced in playing or recording.

Because of the increased back tension on the tape, the edges of the tape are permanently deformed and the recorded signal carried on the tape is degraded in quality and accordingly the quality of reproduction is lowered.

The present invention is concerned with various types of tape magazines having two cores or hubs without a flange.

SUMMARY OF THE INVENTION

The primary object of the present invention is to provide a magnetic tape magazine in which the tape is wound smoothly into a coil or convolution having flat side faces.

Another object of the present invention is to provide a magnetic tape magazine in which the tape is smoothly fed at a high speed with small back tension.

The magnetic tape magazine in accordance with the present invention is characterized in that one or more cushion sheets are interposed between the inner face of the case of the magazine and the friction sheet in the magazine to constantly urge the friction sheet against the side face of the tape convolution.

BRIEF DESCRIPTION OF THE DRAWING

FIG. 1 is a plan view showing the internal structure of a magnetic tape magazine in accordance with an embodiment of the present invention, FIG. 2 is a side sectional view of the tape magazine as shown in FIG. 1 taken along the line II—II thereof, FIG. 3 is an enlarged side sectional view showing the internal structure in part of the tape magazine in accordance with an embodiment of the present invention, FIG. 4 is a perspective view showing an example of the cushion sheet employed in the tape magazine in accordance with the present invention, FIG. 5 is a schematic diagram which shows the method of measuring the condition of the side face of the tape convolution wound on a hub in a tape magazine.

DESCRIPTION OF THE PREFERRED EMBODIMENTS

Figure 6:
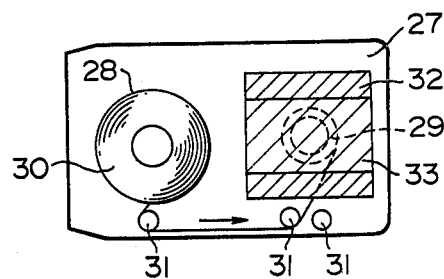
FIG. 6 is a plan view showing another embodiment of the tape magazine in accordance with the present invention.

Referring to FIGS. 1 and 2 which show an embodiment of the present invention, a rectangular casing 1 is provided with a feed-out hub 2 and a take-up hub 3 rotatably mounted therein. A magnetic tape 4 is wound on the feed-out hub 2 and taken up on the take-up hub 3 as designated by 5 by way of guide rollers 6 and 7. A pair of friction sheets 12 having a size large enough to cover the two convolutions of the tape 4 and 5 are provided between the tape convolutions and the upper and lower walls 1a of the casing 1 of the magazine as clearly shown in FIG. 2. Between the friction sheets 12 and the walls 1a of the tape magazine are interposed a pair of cushion sheets 13 which urge the friction sheets 12 against the side faces of the tape convolutions 4 and 5 so that a constant pressure may be imparted on the side face thereof.

As shown in FIGS. 3 and 4, the cushion sheets 13 have a thickness D larger than the spaces $d1$ and $d2$ between the side faces of the tape convolutions 4 and 5 and the inner walls 1a and 1a of the casing 1 so that the friction sheets 12 are pressed against the side faces of the tape convolutions 4 and 5 with a constant pressure.

The cushion sheet 13 has a pair of circular openings 14 and 14 to be engaged with the hubs 2 and 3 and a rectangular window 15 therebetween to be aligned with a transparent window (not shown) of the casing 1 for viewing the size of the convolutions.

Figure 7:
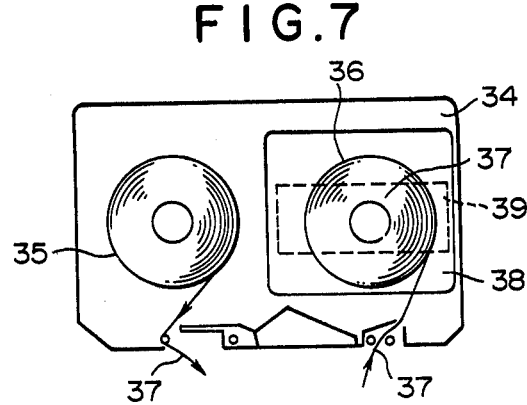
FIG. 7 is a plan view showing still another embodiment of the tape magazine.

The cushion sheets employed in the tape magazine as described above can be applied to various types of tape magazines or cartridges as shown in FIGS. 6 and 7 which will be described in detail hereinafter.

The cushion sheets 13 are desirably designed to cover 50 to 60% of the whole area of the side faces of the tape convolutions 4 and 5 in the tape magazine. If the cushion sheets 13 cover the whole area of the side faces of the tape convolutions, the friction becomes too great between the friction sheets 12 and the side faces of the tape convolutions 4 and 5. On the other hand, from the viewpoint of the effect of the cushion sheets 13 which press the friction sheets 12 onto the side faces of the tape to make the side faces of the tape convolutions flat, it is only required to press the tape side from the center to the margin of the convolution along a radius thereof.

Therefore, it is desirable to press only a part of the side faces of the tape convolutions along a radius of each.

From the above reason, the elasticity of the material of the cushion sheets is preferred to be $10^2$ to $10^4$ Kg/cm$^2$. This elasticity is that according to the method of measurement as defined in ASTMD638, D695 and D790. The pressure imparted on the side faces of the tape convolutions is desired to be about 0.1 to 0.69 g/cm$^2$.

The cushion sheets can be made of foamed plastic sheet materials such as foamed styrene, foamed urethane and foamed polyethylene; rubber sheet materials such as urethane rubber, neoprene rubber, chloroprene rubber, butadiene rubber, styrene butadiene rubber, ethylene propylene rubber, nitrile butadiene rubber, silicone rubber, fluoro-rubber and acrilic rubber; plastic sheet materials such as polyethylene, polypropyrene, cellulose triacetate, polyethylene terephthalate, polyethylene-2,6-naphthalate, polybuthylene terephthalate and polyamide; paper sheet material such as long fiber type Japanese paper, non-woven cloth and synthetic paper; spring shaped metal sheet or wire mesh. These materials can be used mixed with lubricant or antistatic agent, or used with lubricant or antistatic agent applied thereto.

The cushion sheets employed in the present invention can be made of elastic material other than the above described materials. Further, the sheets may be provided with folding lines or embosses to work as spring sheets.

The thickness of the cushion sheets can be selected according to the shape, structure and material between about 10 to 500μm.

As the lubricant to be mixed with or coated on the cushion sheets, various known lubricants can be employed such as silicone oil, carbon black, graphite, carbon black graphite polymer and so forth.

As the antistatic agent to be mixed with or coated on the cushion sheets, various known antistatic agents can be used, for instance, conductive powder of graphite, carbon black, carbon black graphite polymer, or surface active agent of various kinds.

Now the preferred embodiments of the present invention will further be described in detail with reference to several examples thereof.

The data indicated in each example were obtained by measuring systems as follows.

STATE OF CONVOLUTION

The state of alignment of edges of the tape wound in convolution was measured by use of a surface detecting system as shown in FIG. 5. Referring to FIG. 5, a lamp 21 is connected with a light source power 20 such as a D.C. power source and emits light to illuminate the surface of the side face 17 of a tape convolution 16 wound on a hub 18. A condenser lens system 22 is provided between the lamp 21 and the tape convolution 16 to condense the light from the lamp 21 onto the surface of the side face 17 of the tape convolution 16. Another condenser lens system 23 is provided above the tape convolution 16 to receive the light reflected by the side face 17 of the tape convolution 16 and condense the light onto a phototransistor 24. The phototransistor 24 receives the light condensed through the condenser lens system 23 and converts the light to electricity. A meter 26 is connected with the phototransistor 24 by way of an amplifier 25 to indicate the amount of light received by the phototransistor 24 in terms of a percentage which represents the reflectance of the side face 17 of the tape convolution 16. The percentage indicative of the reflectance is shown in the table of data in which (a) indicates the reflectance under the condition of PLAY, and (b) indicates the reflectance under the condition of REWIND. The percentage of the reflectance is calibrated with the reflectance of a mirror placed on the side face 17 set 100%. The percentage should preferably be over 60% in case of an ordinary audiocassette.

TENSION

The back tension of the tape was measured with a torque meter model M-400 made by Information Terminal Company.

DISTORTION

The distortion of the tape was observed after it had been used 50 times.

PHASE SHIFT

The phase shift between the right channel and the left channel for a signal of 6.3 KHz recorded on a tape was measured with a phase meter model MPN-553 made by Meguro Dempa Co., Ltd., Japan. As the tape recorder was used a digital cassette evaluator model CT-10 made by Nakamichi Kenkyusho.

DROP-OUT

As the drop-out, the number of output drops over 50% per minute of a signal of 6.3 KHz was measured.

EXAMPLE I

A non-woven cloth having a thickness of 100 microns, a width of 20mm and a length of 80mm was provided in a tape magazine as the cushion sheet in accordance with the present invention as shown in FIG. 1. The magnetic tape used had a base thickness of 5 microns and a magnetic layer thickness of 4 microns, and was of high density type. The length of the tape was 180m. The pressure exerted on the side face of the tape convolution by the cushion sheet was 2 g/cm$^2$ (Sample No. 1). The results measured were as shown in Table I in comparison with a conventional magazine without the cushion sheet (Sample No. 2). The cassette tape deck used for the test was model TC-4250SD (made by SONY Corp.).

TABLE I

| Measured Item | Sample No.1 (a) | Sample No.1 (b) | Sample No.2 (a) | Sample No.2 (b) |
| --- | --- | --- | --- | --- |
| State of Convolution | 74% | 70% | 43% | 34% |
| Initial Back Tension | 12g | | 5–25g | |
| Tension after 50 plays | 17g | | 10–43g | |
| Tape Distortion after 50 plays | None | | Edge expanded | |
| Phase Shift | under 5' | | 10–15° | |
| Drop-out after 50 plays | 6 | | 30 | |

EXAMPLE II

A synthetic paper (polyethylene) containing powder of carbon black and silicone was used as the cushion sheet in accordance with the present invention as shown in FIG. 1. The thickness of the sheet was 80 microns, the length was 80mm and the width was 20mm. The pressure exerted thereby on the side face of the tape convolution was 0.17 g/cm$^2$. The tape was the same as that used in Example I. The results measured were as shown in Table II. (Sample No. 3)

EXAMPLE III

A foamed polyethylene sheet having a thickness of 110 microns was used as the cushion sheet in accordance with the present invention as shown in FIG. 1. The length of the belt was 80mm and the width thereof was 40mm. The tape was the same as that used in Example I. The pressure on the tape side was 0.29 g/cm$^2$. The results measured were as shown in Table II. (Sample No. 4)

TABLE II

| Measured Item | Sample No.3 (a) | Sample No.3 (b) | Sample No.4 (a) | Sample No.4 (b) |
|---|---|---|---|---|
| State of Convolution | 70% | 63% | 77% | 75% |
| Initial Back Tension | | 17g | | 19g |
| Tension after 50 plays | | 23g | | 26g |
| Tape Distortion after 50 plays | | None | | None |
| Phase Shift | | under 5.7° | | under 4° |
| Drop-out after 50 plays | | 13 | | 6 |

EXAMPLE IV

A non-woven cloth (same as the one used in Example I) having a width of 30mm, a thickness of 50 microns and a length of 85mm was provided in a video tape cassette containing a magnetic tape having a length of 180m as shown in FIG. 6 (Sample No. 5). The video tape recorder used was model VTC-7230 made by Sanyo Electric Co., Ltd., Japan. The results measured were as shown in Table III in comparison with a conventional magazine without a cushion sheet (Sample No. 6).

TABLE III

| Measured Item | Sample No.5 | Sample No.6 |
|---|---|---|
| Jitter | 2 μsec | 3-4 μsec |
| Drop-out after 50 plays | 17 | 27 |
| Durability | over 140 times | 90 times |
| State of Convolution (PLAY) | 76% | 62% |

The video tape cassette as shown in FIG. 6 employed in this example was comprised of a casing 27, a tape feed-out reel 28, a tape take-up reel 29, a video tape 30 wound thereon, guide rollers 31, a pair of friction sheets 32, and a pair of cushion sheets 33.

As mentioned hereinbefore, the present invention can be applied to various types of tape magazines. FIG. 7 shows an example of those tape magazines to which the present invention is applicable. The tape magazine as shown in FIG. 7 is comprised of a casing 34, a feed-out reel 35, a take-up reel 36, a video tape having a width of ¾ inch (U-matic, Sony Corp.) 37, a pair of friction sheets 38 and a pair of cushion sheets 39 interposed between the casing and the friction sheets.

We claim:

1. A magnetic tape magazine comprising a casing, a tape feed-out core, a tape take-up core, a magnetic tape wound in convolutions on said feed-out and take-up cores, and a pair of friction sheets interposed between the tape convolutions and inner walls of the casing wherein the improvement comprises a pair of cushion sheets made of elastic material interposed between said friction sheets and the inner walls of the tape magazine, said cushion sheets each having a thickness larger than the space between the side faces of the tape convolutions and the inner wall of the tape magazine, the thickness being so selected that the pressure imparted on the side faces of the tape convolutions is 0.1 to 0.69g/cm$^2$.

2. A magnetic tape magazine as defined in claim 1 wherein said elastic material of said cushion sheets has elasticity of $10^2$ to $10^4$ kg/cm$^2$.

3. A magnetic tape magazine as defined in claim 2 wherein said elastic material of said cushion sheets is non-woven cloth.

4. A magnetic tape magazine as defined in claim 2 wherein said elastic material of said cushion sheets is foamed plastics.